United States Patent [19]

Illingworth et al.

[11] 3,932,206

[45] Jan. 13, 1976

[54] PROCESS FOR DE-INKING PRINTED WASTE CELLULOSIC FIBROUS MATERIAL

[75] Inventors: Robert H. Illingworth, Madison; Frank W. Lorey, Ramsey, both of N.J.

[73] Assignee: Garden State Paper Co., Inc., Garfield, N.J.

[22] Filed: May 28, 1974

[21] Appl. No.: 473,933

Related U.S. Application Data

[63] Continuation of Ser. No. 247,683, April 26, 1972, abandoned.

[52] U.S. Cl. .......................................... 162/5; 162/4
[51] Int. Cl.² .......................................... D21C 5/02
[58] Field of Search ............................. 162/5, 4

[56] References Cited
UNITED STATES PATENTS

| | | | |
|---|---|---|---|
| 3,056,713 | 10/1962 | Gartner | 162/5 |
| 3,069,308 | 12/1962 | Lissant | 162/5 |
| 3,354,028 | 11/1967 | Illingworth et al. | 162/5 |
| 3,392,083 | 2/1968 | Illingworth | 162/5 |
| 3,446,696 | 5/1969 | Illingworth | 162/5 |
| 3,808,089 | 4/1974 | Von Koeppen et al. | 162/5 |

FOREIGN PATENTS OR APPLICATIONS

| | | | |
|---|---|---|---|
| 1,453,204 | 8/1966 | France | 162/5 |

*Primary Examiner*—S. Leon Bashore
*Assistant Examiner*—Arthur L. Corbin
*Attorney, Agent, or Firm*—Morgan, Finnegan, Pine, Foley & Lee

[57] ABSTRACT

Waste printed, cellulosic fibrous material is de-inked by using a biodegradable de-inking agent which is non-toxic to aquatic life, said agent comprising an ethoxylated aliphatic mono-ol having about 14-15 carbon atoms in the aliphatic chain and about 8-12 ethyleneoxy units per mole of said mono-ol or an ethoxylated aliphatic di-ol having from 14 to 30 carbon atoms in the aliphatic chain and from 8 to 24 ethyleneoxy units per mole of said di-ol wherein the hydroxy groups in the di-ol are present on adjacent non-terminal carbon atoms in the aliphatic chain.

29 Claims, No Drawings

PROCESS FOR DE-INKING PRINTED WASTE CELLULOSIC FIBROUS MATERIAL

This is a continuation, of application Ser. No. 247,683, filed Apr. 26, 1972, now abandoned.

This invention relates to improvements in de-inking printed waste cellulosic stock.

BACKGROUND OF THE INVENTION

It is an object of the present invention to provide methods and agents for de-inking printed cellulosic material to produce a pulp that can be handled on conventional paper making machines to produce newsprint, magazine and book stock.

Many methods and compositions are well known to be useful for de-inking printed paper, and the most efficient involve the use of non-ionic surface active agents. Unfortunately, the best non-ionic compounds tend to lack biodegradability and many of them are toxic to marine life, such as fish, making disposal of effluent from such processes a problem. A very broad family of non-ionic agents is disclosed by Lissant, U.S. Pat. No. 3,069,308, to be useful as de-inking agents. Lissant's compounds in their broadest aspects are non-ionic oxyalkylated alcohols. Specifically disclosed by Lissant to be useful are ethoxylated and propoxylated derivatives of lauryl ($C_{12}$) alcohol, methoxytripropylene ($C_{10}$) glycol, tridecyl ($C_{13}$) alcohol, n-butyl ($C_4$) alcohol, furfuryl (heterocyclic) alcohol, and polyvinyl (polyol) alcohol.

It has now been discovered that within this broad teaching there exists a narrow family of ethoxylated alcohols which are different from the preferred embodiments of Lissant and which provide a very efficient removal of ink and result in paper with excellent brightness and strength. Moreover, the particular agents of this invention have surprisingly been found to be free of toxicity against marine life and are biodegradable, making disposal of process effluents into rivers and streams an acceptable practice.

DESCRIPTION OF THE INVENTION

The de-inking agents of the present invention comprise compounds which are biodegradable and non-toxic to aquatic life and comprise ethoxylated aliphatic mono-ols or di-ols having from 14 to 30, preferably, 14 to 18, carbon atoms in the aliphatic chain and from 8 to 24, preferably, 8 to 12, ethyleneoxy units per mole of said mono- or di-ol, In general, the preferred de-inking agent will be an ethoxylated aliphatic mono-ol having from 14 to 15 carbon atoms in the aliphatic chain or an ethoxylated aliphatic di-ol, the di-ol groups being on adjacent, non-terminal carbon atoms in a chain of from 15 to 17 carbon atoms, all such compounds being further characterized by having from 9 to 11 ethyleneoxy units per mole of mono- or di-ol.

In the di-ol embodiment, the ethyleneoxy units can be all on one of the two hydroxy groups, the other being free, or they may be divided in any proportion between both hydroxy groups. The present invention contemplates the use of mixtures of such mono-ols and di-ols as well as the individual compounds. Those skilled in the art of preparing and using ethoxylated surface active agents will be aware of the existence of a range of chain lengths in both the aliphatic chain and in the chain or chains of repeating ethyleneoxy units, because of the manner in which they are produced. Characterization in terms of numbers of carbon atoms and repeating units should be recognized to refer to averages within these ranges.

With respect to the preferred embodiments of above-mentioned U.S. Pat. No. 3,069,308, the ethoxylated mono-ols of this invention have a minimum average of 14 carbons in the aliphatic chain, whereas in the patent the maximum is 13 carbons; with respect to the di-ols of this invention, the preferred embodiments of the patent have a maximum of 10 carbon atoms, whereas the minimum herein is 14 carbon atoms.

Those skilled in the art will be able to prepare the deinking agents of this invention following well-known procedures. For example, the ethoxylated aliphatic mono-ol can be prepared by reacting a $C_{14}$-$C_{18}$ fatty alcohol with an appropriate quantity of ethylene oxide under moderate conditions of temperature and pressure, e.g., 160°–180°C. at 3 atmospheres, in the presence of alkaline catalysts, e.g., caustic soda. Entirely analogous procedures are used to ethoxylate the corresponding di-ols. More detailed descriptions of such processes are found in standard textbooks, such as A. M. Schwartz and J. W. Perry, "Surface Active Agents", Vol. I (1949); and "Surface Active Agents and Detergents" Vol. II (1958), Interscience Publishers, New York, the descriptions of which are incorporated herein by reference.

The de-inking agents are used in solution in substantially aqueous media.

The temperature of the de-inking solution may vary anywhere from room temperature, e.g., 40° to 70°F., up to about 200°F.

Best results are achieved with the de-inking solutions described herein when they are alkaline in pH. It therefore is desirable that an alkali be included therein. Although any suitable alkali or alkaline earth metal hydroxide or salt may be employed, the alkali metal hydroxides and salts, such as sodium hydroxide, potassium hydroxide, soda ash and the like are preferred. Enough of the alkali should be added to maintain the pH of the de-inking solution between about 7.0 and 11.5, or even higher, and preferably at least 7.1.

In preparing the de-inking solution, water is charged to the reactor or pulper and about 0.3 to 3 percent, based on the weight of the paper, of the de-inking agent described hereinabove is added. The de-inking agent is preferably added to the water prior to the addition of the wastepaper or waste.

To the resulting solution is added the printed paper, scrap or waste. The printed cellulosic charge may, if desired, be shredded by appropriate means prior to treatment. This, however, is not necessary, and the waste material may be added to the treating solution without shredding or without any sub-division in size whatsoever. It is one of the advantages of this invention that costly shredding or pulping techniques prior to de-inking need not be employed. Thus, the waste material to be de-inked is preferably added to the treating solution in its naturally dry condition, i.e., without being subjected to moisture or water other than that which is normally present in the atmosphere Although de-inking will occur if the waste material is first slurried or pulped in water, in general it has been found that the results achieved are inferior to those obtained when the waste material is added to the treating solution in its naturally dry condition, i.e., in equilibrium with its natural atmospheric environment. Although not wanting to be restricted to this interpretation , it appears that wetting the waste material with water prior to subjecting it to the chemical treatment described herein has a tendency to set the ink and make it more difficult to remove from the cellulosic fibers. The amount of the scrap or waste added to the treating solution should be controlled. In general, the per cent of cellulosic material by weight of the aqueous de-inking solution should be below 10 per cent and preferably below 6.0 per cent, or between about 4.0 and 6.0 percent. Good results are obtained when the de-inking solution contains about 5 to 5.5 per cent by weight of paper and this value appears to be optimum. The scrap is retained in the treating solution until substantial defiberization and separation of the ink takes place.

Following treatment, the defibered material is dropped to a chest or other suitable reservoir, after which it is diluted with water to a solids content of between about 0.5 and 1.5 per cent, preferably about 1.0 per cent, based upon the solution weight.

Following dilution, the pulp is separated from the solution and washed and thickened by well known methods. Optionally, the pulp is then acidified to a pH of between about 4 and 6.5, preferable between about 4.5 to 5.5, thickened and then formed into a web.

This acidification step has been found to significantly increase the brightness of the paper produced from the recovered pulp, and also avoids the necessity of bleaching the pulp.

The recovered stock may be blended with fresh virgin sulfate or sulfite stock, or with additional recovered stock to make cellulosic articles, such as newspaper, and so forth.

DESCRIPTION OF THE PREFERRED EMBODIMENTS

The nature of the de-inking process will be made more clear by reference to the following examples and comparative trials.

EXAMPLE 1

A de-inking solution is made by dissolving 20.6 g. of an ethoxylated $C_{14}$-$C_{15}$ primary mono-ol, containing about 9.6 moles of ethyleneoxy units per mole of mono-ol; and adjusting the pH to about 10.5 with alkali and adding 8 grams of alkali metal silicate in a laboratory pulping unit at 90°F. One hundred grams of printed waste newspaper (New York Times) is added to the pulping unit and agitation is carried out for 20 minutes, during which time the temperature increases to 100°–102°F. The de-inked pulp is then washed with a spray of water in a sieve-type filtering device and then paper sheets are made from the washed material by pressing in a small hand press.

An aliquot of 40 g. wet weight basis of the washed pulp (3 g. dry weight basis) is mixed with 0.002 g. of sulfur dioxide gas, heated to 145°F. in 20 minutes, and then formed into hand sheets by the same technique.

EXAMPLE 2

The procedure of Example 1 is repeated substituting for the ethoxylated aliphatic mono-ol, an equal weight of an ethoxylated $C_{15}$-$C_{17}$ aliphatic di-ol, having both hydroxyl groups on adjacent, non-terminal carbon atoms, and containing an average of 10 moles of ethyleneoxy units per mole of di-ol. Paper hand sheets are formed from the de-inked pulp by the same technique, with and without acidification with sulfur dioxide.

COMPARATIVE TRIAL A

The procedure of Example 1 is repeated substituting for the ethoxylated $C_{14}$-$C_{15}$ primary alcohol, an equal weight of an ethoxylated $C_{11}$ primary mono-ol containing only 5 moles of ethyleneoxy units per mole of alcohol. Paper hand sheets are prepared from the de-inked pulp by the same technique, with and without sulfur dioxide treatment.

COMPARATIVE TRAIL B

The procedure of Example 1 is repeated substituting for the ethoxylated $C_{14}$-$C_{15}$ primary mono-ol, an equal weight of an ethoxylated $C_{15}$-$C_{17}$ aliphatic di-ol containing only 5 moles of ethyleneoxy units per mole of di-ol. Paper hand sheets are prepared from the de-inked pulp, by the same technique with and without sulfur dioxide treatment.

The paper sheets formed in the above Examples and Comparative trials are examined for residual ink spots and the brightness is measured with a green filter under standard conditions, adopted by the American Newspaper Publishers Association REsearch Institute, based on A. C. Hardy - Handbook of Colorimetry, Technology Press, Boston (1936) and using an Elrepho Colorimeter.

The results are summarized in the Table:

Table

| | De-inking of Printed Newspaper with Ethoxylated Aliphatic Mono- and Di-ols | | | |
|---|---|---|---|---|
| Example No | De-inking agent | Final pH | Green Filter Brightness | |
| | | | without $SO_2$ | with $SO_2$ |
| 1 | $C_{14}$-$C_{15}$ primary mono-ol adduct with 9.6 EO units | 10.1 | 57.7 | 63.8 |
| 2 | $C_{15}$-$C_{17}$ non-terminal di-ol adduct with 10 EO units | 10.0 | 59.3 | 64.2 |
| A | $C_{11}$ primary mono-ol adduct with 5 EO units | 9.8 | * | 61.4* |
| B | $C_{15}$-$C_{17}$ aliphatic di-ol adduct with 5 EO units | 10.1 | 56.2 | 61.2 |

*Paper sheets had many ink spots.

It can be seen that the reflectance (brightness) of the papers prepared from de-inked pulp using the particular agents of Examples 1 and 2 is substantially higher than that using the agents of Comparative trials A and B. Furthermore, the agent of Comparative trial A provided papers with many ink spots, indicating that this would be an unacceptable agent in any event, even apart from the lower reflectance values. In the case of the agent of Comparative trial B, the brightness both before and after treatment with sulfur dioxide was inferior to that provided by the agents of Examples 1 and 2 of the present invention.

EXAMPLE 3

To show that the present process is applicable to another substrate, the procedure of Example 1 is repeated substituting for the New York Times, an equal weight of the New Brunswick Home News. The pH at the end of the pulping period is 10.1. Efficiently de-inked pulp is again obtained, and this is converted into strong paper having a green filter brightness of 57.5 without sulfur dioxide treatment and 63.9 with sulfur dioxide treatment.

The de-inking agents of Examples 1 and 2 are tested by standard procedures and are found to be biodegradable and substantially free of toxicity to marine life at concentrations of ordinary use.

For large scale operation, about 25 to 35 lbs. of de-inking agent is used, with correspondingly-adjusted quantities of other additives, if used, based on one ton of dry paper. The solution is charge to or made up in a hydropulper. Waste printed paper is added to the solution to provide a slurry comprising about 6 percent paper and 94 percent water.

Pulping is continued until the ink is separated from the fibers.

After a suitable period of time in the pulper, the mixture is dropped to a storage chest which is preferably equipped with a suitable agitator. If desired, water may be charged to the chest to reduce the solids content of the mixture therein. The mixture from the chest is then diluted to the solids content indicated hereinabove, and washed and thickened in a well known manner. The pulp may be thickened to about a 5 percent solids consistency, or between about a 3 to 8 percent solids consistency in this manner. Co-current or counter-current washing, alone or in combination, may be used. The resulting pulp is then acidified to the pH indicated hereinabove by addition thereto of a dilute solution of a suitable acid, as for example, alum, sulfuric acid, $SO_2$, and so forth. The resulting pulp may be finally thickened and formed into a web. The number of thickening and washing steps preceding the acidification step, it should be understood, is not critical, and the number of such treatments will be governed largely by the type of equipment employed. Also, if desired, the pulp may be bleached, using a suitable bleaching agent, following acidification. Ordinarily, however, bleaching is not required. When only acidification is used, the pulp need not be, and preferably is not, washed following acidification.

Although in the examples a batch, or more properly, a semibatch process is indicated, it should be understood that the de-inking may be carried out using a continuous process, as will be obvious to those skilled in the art.

The water used in the process may be soft and iron-free.

The invention in its broader aspects is not limited to the specific compositions, steps and methods described, but departures may be made therefrom within the scope of the accompanying claims without departing from the principles of the invention and without sacrificing its chief advantages.

We claim:

1. A process for de-inking waste, printed cellulosic fibrous material which comprises the following steps:
    a. Adding waste, printed, cellulosic fibrous material to a de-inking solution comprising (1) water, (2) a de-inking agent which is biodegradable and non-toxic to aquatic life and is selected from the group consisting of ethoxylated aliphatic di-ols having from 14 to 30 carbon atoms in the aliphatic chain and from 8 to 24 ethyleneoxy units per mole of di-ols and wherein the hydroxy groups in the di-ols are present on adjacent non-terminal carbon atoms in the aliphatic chain; and (3) a material present in sufficient quantity to maintain an alkaline pH of the de-inking solution between about 7.0 and 11.5;
    b. Contacting said printed material with the de-inking solution until the ink separates from the fibers; and
    c. Washing the de-inked cellulosic fibrous material.

2. A process as defined in claim 1 wherein said di-ol has from 15 to 17 carbon atoms in the aliphatic chain and from 9 to 11 ethyleneoxy units per mole of said di-ol.

3. A process as defined in claim 1 wherein the printed cellulosic material is present in an amount below about 10% by weight of the aqueous solution, and the de-inking agent is present in an amount between about 0.3 and 3% based upon the weight of the cellulosic material.

4. A process as defined in claim 3 wherein said di-ol has an average of from 15 to 17 carbon atoms in the aliphatic chain and from about 9 to 11 ethyleneoxy units per mole of said di-ol.

5. A process as defined in claim 3 wherein the process is carried out at a temperature between about 40°F to about 200°F, said alkaline material is selected from alkali metal hydroxides and silicates and wherein after the washing step the pH of the cellulosic material is reduced to between about 4.0 and 6.5.

6. A process as defined in claim 1 wherein the pH of the cellulosic material is reduced to between about 4.0 and 6.5 following washing.

7. A process as defined in claim 1 wherein said process is carried out at a temperature between about 40°F to about 200°F.

8. A process as defined in claim 1 wherein said material for maintaining alkaline pH is selected from the group consisting of alkali metal or alkaline earth metal hydroxides and salts.

9. A process for de-inking waste, printed cellulosic fibrous material to produce a pulp for use in making newsprint, which comprises the following steps:
    a. Adding waste, printed, cellulosic fibrous material to a de-inking solution comprising (1) water, (2) a de-inking agent which is biodegradable and non-toxic to aquatic life and is selected from the group consisting of ethoxylated aliphatic mono-ols having about 14 to 15 carbon atoms in the aliphatic chain and about 8 to 12 ethyleneoxy units per mole of said mono-ol; and (3) a material present in sufficient quantity to maintain an alkaline pH of the de-inking solution between about 7.0 and 11.5;
    b. Contacting said prinited cellulosic material with the de-inking solution until the ink separates from the fibers;
    c. Diluting the cellulosic material in the solution by adding water in sufficient amount to reduce the solids content to between about 0.5 to 1.5 percent based upon the solution weight; and
    d. Washing the de-inked diluted cellulosic material.

10. A process as defined in claim 9 wherein said process is carried out at a temperature between about 40°F to about 200°F.

11. A process as defined in claim 9 wherein said material for maintaining alkaline pH is selected from the group consisting of alkali metal or alkaline earth metal hydroxides and alkali metal silicates.

12. A process as defined in claim 9 wherein the printed cellulosic material is present in an amount below about 10% by weight of the aqueous solution, and the de-inking agent is present in an amount between about 0.3 and 3% based upon the weight of the cellulosic material.

13. A process as defined in claim 12 wherein the amount of printed cellulosic fibrous material added to the de-inking solution is between about 4.0 and 6.0 percent by weight of the solution.

14. A process as defined in claim 9 wherein the pH of the cellulosic material is reduced to between about 4.0 and 6.5 following washing.

15. A process as defined in claim 9 wherein said de-inking agent is an ethoxylated aliphatic primary mono-ol.

16. A process as defined in claim 15 wherein said mono-ol is an ethoxylated aliphatic primary mono-ol having an average of from 14 to 15 carbon atoms in the aliphatic chain and an average of from 9 to 11 ethyleneoxy units per mole of said mono-ol.

17. A process as defined in Claim 15 wherein the printed cellulosic material is present in an amount below about 10% by weight of the aqueous solution, the de-inking agent is present in an amout between about 0.3 and 3% based upon the weight of the cellulosic material, said material for maintaining alkaline pH is selected from the group consisting of alkali metal or alkaline earth metal hydroxides and alkali metal silicates and wherein said process is carried out at a temperature between about 40°F to about 200°F.

18. A process for de-inking waste, printed cellulosic fibrous material to produce a pulp for use in making newsprint which comprises the following steps:
 a. Adding waste, printed, cellulosic fibrous material to a de-inking solution comprising (1) water, (2) a de-inking agent which is biodegradable and non-toxic to aquatic life and is selected from the group consisting of ethoxylated aliphatic mono-ols having about 14 to 15 carbon atoms in the aliphatic chain and about 8 to 12 ethyleneoxy units per mole of said mono-ol, and (3) a material present in sufficient quantity to maintain an alkaline pH of the de-inking solution between about 7.0 and 11.5;
 b. Contacting said printed material with the de-inking solution until the ink separates from the fibers;
 c. Washing the de-inked cellulosic material with water; and
 d. Acidifying said washed de-inked cellulosic material by reducing its pH to between about 4.0 and 6.5.

19. A process as defined in claim 18 wherein said process is carried out at a temperature between about 40°F to about 200°F.

20. A process as defined in claim 18 wherein said material for maintaining alkaline pH is selected from the group consisting of alkali metal or alkaline earth metal hydroxides and salts.

21. A process as defined in claim 18 wherein the printed cellulosic material is present in an amount below about 10% by weight of the aqueous solution, and the de-inking agent is present in an amount between about 0.3 and 3% based upon the weight of the cellulosic material.

22. A process as defined in claim 18 wherein said de-inking agent is an ethoxylated aliphatic primary mono-ol.

23. A process as defined in claim 22 wherein said mono-ol is an ethoxylated aliphatic primary mono-ol having from 14 to 15 carbon atoms in the aliphatic chain and from 9 to 11 ethyleneoxy units per mole of said mono-ol.

24. A process as defined in claim 22 wherein the printed cellulosic material is present in an amount below about 10% by weight of the aqueous solution, the de-inking agent is present in an amount between about 0.3 and 3% based upon the weight of the cellulosic material, said material for maintaining alkaline pH is selected from the group consisting of alkali metal or alkaline earth metal hydroxides and alkali metal silicates and wherein said process is carried out at a temperature between about 40°F to about 200°F.

25. A process as defined in claim 18 wherein after contacting and before washing, the cellulosic material is diluted by the addition of water to the solution in sufficient amount to reduce the solids content to between about 0.5 to 1.5 percent based upon the solution weight.

26. A process for de-inking waste, printed paper to produce a pulp for use in making newsprint, which comprises the following steps:
 a. Adding waste, printed paper to a de-inking solution consisting essentially of (1) water, (2) a de-inking agent which is biodegradable and non-toxic to aquatic life and is selected from the group consisting of ethoxylated aliphatic mono-ols having about 14 to 15 carbon atoms in the aliphatic chain and from about 8 to 12 ethyleneoxy units per mole of said mono-ols; and (3) an alkaline material selected from the group consisting of alkali metal and alkaline earth metal hydroxides and alkali metal silicates present in sufficient quantity to maintain the alkaline pH of the de-inking solution between about 7.0 and 11.5;
 b. Contacting said waste paper with the de-inking solution until the ink separates from the waste paper fibers;
 c. Diluting the waste paper fibers in the solution by adding water in sufficient amount to reduce the solids content to between about 0.5 to 1.5 percent based upon the solution weight; and
 d. Washing the diluted paper fibers.

27. A process as defined in claim 26 wherein the de-inking agent is an ethoxylated aliphatic primary mono-ol.

28. A process as defined in claim 26 wherein the printed paper is present in an amount below about 10% by weight of the aqueous solution, the de-inking agent is present in an amount between about 0.3 and 3% based upon the weight of the paper, and wherein said process is carried out at a temperature between about 40°F to about 200°F.

29. A process as defined in claim 28 wherein the pH of the paper fibers is reduced to between about 4.0 and 6.5 following washing.

* * * * *